United States Patent Office 2,782,225
Patented Feb. 19, 1957

2,782,225

PRODUCTION OF TEREPHTHALIC ACID, ESTERS OR ACID ESTERS

David Gwyn Jones, Norton-on-Tees, England, assignor to Imperial Chemical Industries Limited, a corporation of Great Britain No Drawing. Application April 2, 1954,
Serial No. 420,753

Claims priority, application Great Britain May 1, 1953

5 Claims. (Cl. 260—475)

This invention relates to the production of acids, esters or acid esters.

It has already been proposed to dehydrate dialkyl cyclohexane-2,5-diol-1,4-dicarboxylates in the liquid phase using dehydrating agents such as acetic anhydride, formic acid, zinc chloride, potassium hydrogen sulphate, hydrochloric acid, sulphuric acid, a sulphonic acid such as p-toluene sulphonic acid, or alumina. It has also been proposed to carry out this dehydration by contacting the diol in the vapour phase with a dehydration catalyst, such as alumina, alumina-silica gels, activated clays, zinc oxide, basic aluminum phosphate, and the blue oxide of tungsten.

The present invention provides an improved process for converting cyclohexane-2,5-diol-1,4-dicarboxylic acid or acid esters or di-esters thereof to cyclohexa-1,4-diene-1,4-dicarboxylic acid or acid esters or di-esters thereof.

Thus, according to the present invention, there is provided a process for the production of cyclohexa-1,4-diene-1,4-dicarboxylic acid or acid esters or di-esters thereof, which comprises the step of heating cyclohexane-2,5-diol-1,4-dicarboxylic acid or an acid ester or di-ester thereof in the liquid phase in the presence of a hydroxyl-containing compound selected from water and aliphatic alcohols containing at most four carbon atoms as solvent at a temperature exceeding 150° C.

The preferred hydroxyl-containing solvent for use in the process of the present invention is water. Thus, on heating dimethyl cyclohexane-2,5-diol-1,4-dicarboxylate with water in an autoclave at a temperature of, for example, 200° C., the major product is cyclohexa-1,4-diene-1,4-dicarboxylic acid.

In place of water, aliphatic alcohols containing at most four carbon atoms may be used in the process of the present invention. Methanol is the preferred alcohol. It should be noted that if for this reaction an alcohol is used which does not correspond to the ester employed, the product will probably contain mixed esters. Thus, if dimethyl cyclohexane-2,5-diol-1,4-dicarboxylate is heated with ethyl alcohol at an elevated temperature of, for example, 200° C., the product will contain dimethyl cyclohexa-1,4-diene-1,4-dicarboxylate together with methyl ethyl and di-ethyl cyclohexa-1,4-diene-1,4-dicarboxylates.

It is also possible in the process of the present invention to employ two or more hydroxyl-containing compounds in admixture; thus alcohols may be employed in aqueous solution.

Although it is not a critical factor, it is convenient in the present process to use a hydroxyl compound: di-ester (or acid ester or acid) weight ratio of the order of 2:1 to 10:1.

It should be noted that if a di-ester is used as starting material, and the reaction is carried out in the presence of an alcohol, the major product will be a di-ester or di-esters. If water is used in place of an alcohol, then the major product will be a free acid. When using an acid as starting material and the reaction is carried out in the presence of an alcohol, the product will contain acid esters and di-esters, but, of course, when carrying out the reaction in the presence of water, the product will be an acid.

The reaction disclosed in the present application is carried out in the liquid phase; in consequence, the temperature of operation must not exceed the critical temperature of water or of the alcohol being used. The pressure of operation is not critical, but should be adjusted to retain the reactants in the liquid phase.

The present invention provides an important step in the conversion of a di-alkyl succinate to terephthalic acid or an acid ester or di-ester thereof. Thus, a di-alkyl succinate may be condensed by means of a sodium or sodium alkoxide catalyst to give a disodium derivative of cyclohexa-1,4-diene-2,5-diol-1,4-dicarboxylate. This may be hydrogenated and hydrolysed to give cyclohexane-2,5-diol-1,4-dicarboxylic acid or an acid ester or di-ester thereof which may then be converted by the process of the present invention to cyclohexa-1,4-diene-1,4-dicarboxylic acid or acid esters or di-esters thereof. The cyclohexa-1,4-diene-1,4-dicarboxylic acid or acid esters or di-esters may then be dehydrogenated or oxidised to give terephthalic acid or acid esters or di-esters thereof.

Example 1

22 grams dimethyl cyclohexane-2,5-diol-1,4-dicarboxylate were heated with 120 mls. water at 200° C. for two hours in a stainless steel autoclave. After cooling, 10.9 grams of cyclohexa-1,4-diene-1,4-dicarboxylic acid were separated by filtration from the product, and the colourless mother liquor on concentration gave a residue of 6.5 grams of partially dehydrated acid material. On the assumption that this partially dehydrated acid material could be recycled, the theoretical yield of cyclohexa-1,4-diene-1,4-dicarboxylic acid in this example was 95%. The acid was analytically and spectroscopically pure.

Example 2

23 grams of dimethyl cyclohexane-2,5-diol-1,4-dicarboxylate were heated in a stainless steel autoclave at 200° C. for 36 hours in 80 mls. of methanol. The product was concentrated in vacuo and 1.2 grams of dimethyl cyclohexa-1,4-diene-1,4-dicarboxylate was removed by steam distillation of the pale yellow concentrate. 20.5 grams of unchanged diol were also recovered from the concentrate; this material was not pure diol but contained some of the lactone 4-carbomethoxy-2-hydroxy-6-oxa-bicyclo-[3:2:1]-octa-7-one. The pass yield of dimethyl cyclohexa-1,4-diene-1,4-dicarboxylate was 6% and the yield of this compound was 57%, not taking into account the lactone produced.

I claim:

1. In a process for the conversion of a compound having the structure:

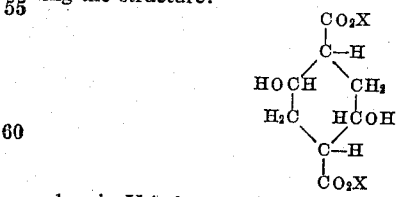

wherein X is lower alkyl, by dehydration and subsequent dehydrogenation to form a compound of the formula:

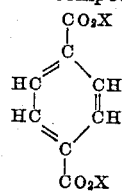

wherein X has the meaning above, the improvement which comprises conducting said dehydration by heating the starting material in the liquid phase in the presence as a solvent of a hydroxyl compound selected from the group consisting of water and aliphatic alcohols containing no more than four carbon atoms, said heating being carried out at a temperature from 150° C. to the critical temperature of said solvent while employing a pressure sufficient to maintain said reaction in the liquid phase.

2. The process of claim 1 wherein said temperature is of the order of 200° C. and said solvent is water.

3. The process of claim 1 wherein said temperature is of the order 200° C. and said solvent is methanol.

4. A process as claimed in claim 1 in which the water:cyclohexane derivative weight ratio is from 2:1 to 10:1.

5. A process as claimed in claim 3 in which the methanol cyclohexane derivative weight ratio is from 2:1 to 10:1.

References Cited in the file of this patent

UNITED STATES PATENTS

| | | |
|---|---|---|
| 784,411 | Merling et al. | Mar. 7, 1905 |
| 784,412 | Merling et al. | Mar. 7, 1905 |
| 2,734,077 | Smith | Feb. 7, 1956 |

FOREIGN PATENTS

| | | |
|---|---|---|
| 738,922 | Germany | Sept. 21, 1943 |

OTHER REFERENCES

Richter: "Textbook of Organic Chemistry," pp. 75, 326, J. Wiley, 1952.